(12) United States Patent
Koishikawa et al.

(10) Patent No.: US 10,351,191 B2
(45) Date of Patent: Jul. 16, 2019

(54) STAND SUPPORT STRUCTURE OF SADDLE RIDING VEHICLE

(71) Applicant: HONDA MOTOR CO., LTD., Tokyo (JP)

(72) Inventors: Takuma Koishikawa, Kumamoto (JP); Kenji Morita, Kikuchi-gun (JP); Mizuki Fujiwara, Kumamoto (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/470,032

(22) Filed: Mar. 27, 2017

(65) Prior Publication Data

US 2017/0282985 A1     Oct. 5, 2017

(30) Foreign Application Priority Data

Mar. 31, 2016 (JP) .................. 2016-073633

(51) Int. Cl.
*B62H 1/02* (2006.01)
*B62K 11/04* (2006.01)
*B62K 19/06* (2006.01)

(52) U.S. Cl.
CPC ............... *B62H 1/02* (2013.01); *B62K 11/04* (2013.01); *B62K 19/06* (2013.01)

(58) Field of Classification Search
CPC ............... B62H 1/02; B62H 1/10; B62H 1/04
See application file for complete search history.

(56) References Cited

U.S. PATENT DOCUMENTS

| 4,582,336 A | 4/1986 | Onoda | |
| 7,793,962 B2* | 9/2010 | Imai | B62H 1/04 |
| | | | 180/219 |
| 9,708,021 B2* | 7/2017 | Ito | B62H 1/02 |
| 2001/0045315 A1 | 11/2001 | Maki et al. | |
| 2010/0051369 A1 | 3/2010 | Kuramochi et al. | |
| 2016/0031504 A1* | 2/2016 | Ito | B62H 1/02 |
| | | | 280/301 |

FOREIGN PATENT DOCUMENTS

| JP | 03-139481 | * 6/1991 |
| JP | 3-139481 A | 6/1991 |

(Continued)

OTHER PUBLICATIONS

Extended European Search Report, dated Sep. 18, 2017, for European Application No. 17163019.7.
(Continued)

*Primary Examiner* — Kevin Hurley
*Assistant Examiner* — Marlon A Arce
(74) *Attorney, Agent, or Firm* — Birch, Stewart, Kolasch & Birch, LLP

(57) ABSTRACT

A stand support structure of a saddle riding vehicle has a main frame, a pivot block configured to swingably support a rear wheel-supporting swing arm, and a stand-supporting bracket. The pivot block has a first plate and a second plate attached to the main frame. The first plate and the second plate are coupled to each other. The first plate has a protrusion protruding outward farther than an extension end of the second plate. The stand-supporting bracket is coupled to a surface of the protrusion facing in a vehicle width direction.

7 Claims, 11 Drawing Sheets

(56) References Cited

FOREIGN PATENT DOCUMENTS

| | | | |
|---|---|---|---|
| JP | 2001-71957 | A | 3/2001 |
| JP | 2001-270485 | A | 10/2001 |
| JP | 2007-62618 | A | 3/2007 |
| JP | 2007-176326 | A | 7/2007 |
| JP | 2008-143377 | A | 6/2008 |
| JP | 2010-52659 | A | 3/2010 |
| JP | 2013-18360 | A | 1/2013 |
| JP | 2015-182707 | A | 10/2015 |

OTHER PUBLICATIONS

Japanese Office Action, dated Aug. 22, 2017, for Japanese Application No. 2016-073633, with English translation.

* cited by examiner

STAND SUPPORT STRUCTURE OF SADDLE RIDING VEHICLE

CROSS-REFERENCE TO RELATED APPLICATION

Priority is claimed on Japanese Patent Application No. 2016-073633, filed Mar. 31, 2016, the content of which is incorporated herein by reference.

BACKGROUND

Field of the Invention

The present invention relates to a stand support structure of a saddle riding vehicle such as a motorcycle or the like.

Description of Related Art

In a saddle riding vehicle such as a motorcycle or the like, a vehicle body stand such as a side stand or the like is installed at a substantially central region in a vehicle forward/rearward direction (for example, see Japanese Unexamined Patent Application, First Publication No. 2008-143377).

In the saddle riding vehicle disclosed in Japanese Unexamined Patent Application, First Publication No. 2008-143377, a pivot block (a pivot plate) configured to swingably support a rear wheel-supporting swing arm is fixed to a main frame of the vehicle at a substantially central position in the vehicle forward/rearward direction, and a stand-supporting bracket is fixed to an outer surface of the pivot block in a vehicle width direction through welding. The vehicle body stand is pivotally attached to a stand-supporting bracket to be flipped up.

SUMMARY

In recent years, in the saddle riding vehicle, a hollow structure is employed even in components other than the vehicle body frame in order to reduce the weight of the vehicle. For example, even in the pivot block attached to the main frame, as two plate members are coupled to each other at inner and outer sides, a structure in which a hollow section is secured between both of the plate members is known.

In the vehicle disclosed in Japanese Unexamined Patent Application, First Publication No. 2008-143377, when a pivot block of such a multi-layered structure is employed, as the stand-supporting bracket is fixed to an outer side-surface of the pivot block having a relatively large thickness in a vehicle width direction through welding, the pivot block and the stand-supporting bracket occupy a large space in the vehicle width direction, and the weight of the vehicle body is also increased.

An aspect of the present invention provides a stand support structure of a saddle riding vehicle capable of suppressing a space occupied by components in a vehicle width direction and reducing in weight of the vehicle.

An aspect of the present invention employs the following configuration in order to solve the above-mentioned problems.

(1) A stand support structure of a saddle riding vehicle according to an aspect of the present invention includes a main frame of the vehicle; a pivot block that is formed by coupling a first plate and a second plate to each other, which are attached to the main frame, and that is configured to swingably support a rear wheel-supporting swing arm; and a stand-supporting bracket attached to the pivot block and configured to support a vehicle body stand, wherein the first plate of the pivot block has a protrusion protruding in a longitudinal direction farther than an extension end of the second plate, and the stand-supporting bracket is coupled to a surface of the protrusion facing in a vehicle width direction.

According to the above-mentioned configuration, the stand-supporting bracket is coupled to the protrusion of the first plate that does not overlap the second plate.

For this reason, an occupied space of the installation section of the stand-supporting bracket in the vehicle width direction is reduced and a reduction in size and weight of the second plate is possible.

(2) In the stand support structure of the saddle riding vehicle of the above-mentioned (1), the second plate may be disposed on an inner side of the first plate in the vehicle width direction, and the stand-supporting bracket may be coupled to an inner surface of the protrusion in the vehicle width direction.

In this case, since the stand-supporting bracket is disposed inside of the protrusion of the first plate in the vehicle width direction, a boundary section between the second plate and the stand-supporting bracket cannot be easily seen from the outside. Accordingly, as the configuration is employed, the appearance of the vehicle can be improved.

(3) In the stand support structure of the saddle riding vehicle of the above-mentioned (2), a thickness of a coupling section of the stand-supporting bracket in the vehicle width direction with respect to the protrusion may be equal to or smaller than a thickness of the second plate in the vehicle width direction.

In this case, the occupied space of the coupling section of the stand-supporting bracket in the vehicle width direction is further reduced, and the vehicle can be further reduced in size.

(4) In the stand support structure of the saddle riding vehicle according to any one of the above-mentioned (1) to (3), the stand-supporting bracket may be joined to the first plate and the main frame.

In this case, since the stand-supporting bracket is joined to not only the first plate but also the main frame, a joining section area of the stand-supporting bracket is increased and joining strength of the stand-supporting bracket is enhanced.

(5) In the stand support structure of the saddle riding vehicle according to any one of the above-mentioned (1) to (4), a supporting hole configured to support another component is formed between the extension end of the second plate and the stand-supporting bracket so as to extend over the extension end and the stand-supporting bracket.

In this case, the supporting hole configured to support the other component can be formed simultaneously with machining of the extension end of the second plate and the end portion of the stand-supporting bracket. Accordingly, when the above-mentioned configuration is employed, the supporting hole can be easily formed and manufacturing costs can be suppressed.

(6) In the stand support structure of the saddle riding vehicle according to any one of claims (1) to (5), a hollow section may be formed between the first plate and the second plate, which are coupled to each other.

In this case, since the inside of the pivot block is made hollow, a reduction in weight of the pivot block and a further reduction in weight of the vehicle as a whole can be achieved.

According to the aspect of the present invention, since the stand-supporting bracket is coupled to the protrusion of the first plate that does not overlap the second plate, suppression of the occupied space of the installation section of the stand-supporting bracket in the vehicle width direction and a reduction in weight of the vehicle can be achieved.

DESCRIPTION OF EMBODIMENTS

Figure 1:
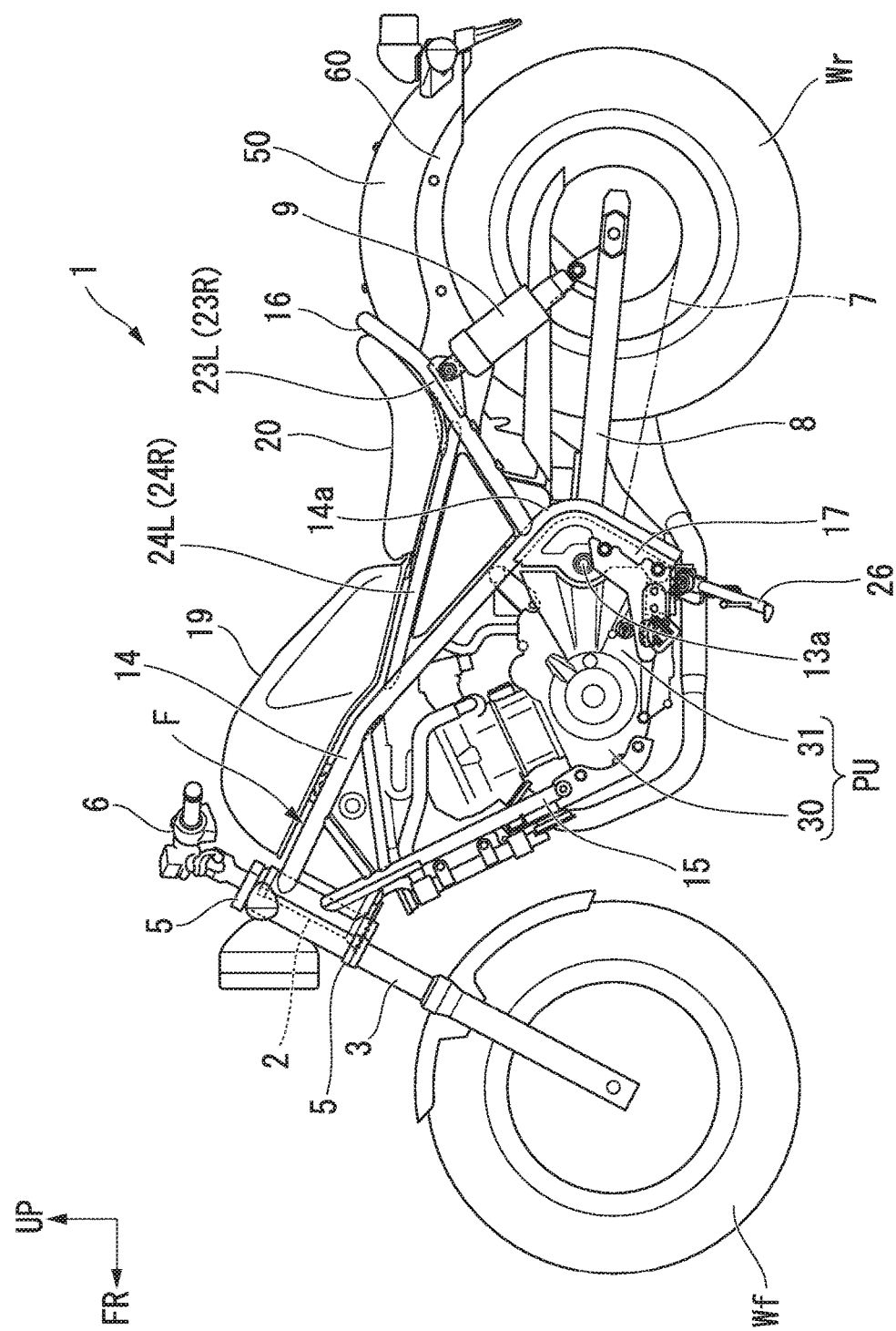
FIG. 1 is a side view of a saddle riding vehicle according to an embodiment of the present invention.

Hereinafter, an embodiment of the present invention will be described based on the accompanying drawings. Further, directions of forward, rearward, left, right, and so on, described below are the same as directions of a vehicle described below unless the context clearly indicates otherwise.

In addition, in appropriate places in the drawings used in the following description, an arrow FR showing a forward direction with respect to a vehicle, an arrow LH showing a leftward direction with respect to the vehicle and an arrow UP showing an upward direction with respect to the vehicle are provided.

FIG. 1 is a view showing a left side-surface of a saddle riding vehicle according to the embodiment. The saddle riding vehicle according to the embodiment is a so-called cruiser type motorcycle 1 in which a vehicle height is decreased and a forward/rearward length is increased. A front wheel Wf of the motorcycle 1 is rotatably supported by lower end portions of a pair of left and right front forks 3. The left and right front forks 3 are supported by a head pipe 2 of a front end portion of a vehicle body frame F via upper and lower bridge members 5 and a steering stem (not shown). A bar type steering handle 6 is attached to the upper bridge member 5.

A rear wheel Wr of the motorcycle 1 is supported by rear end portions of a swing arm 8. A front end portion of the swing arm 8 is vertically and swingably supported by a pivot section 13a of the vehicle body frame F. The rear wheel Wr is linked to an engine 30 serving as a motor of the motorcycle 1 via, for example, a transmission mechanism or the like constituted by a chain 7. Lower end portions of rear cushions 9 serving as a suspension component of the rear wheel Wr side are connected to the swing arm 8 in the vicinity of rear wheel support sections.

Figure 2:
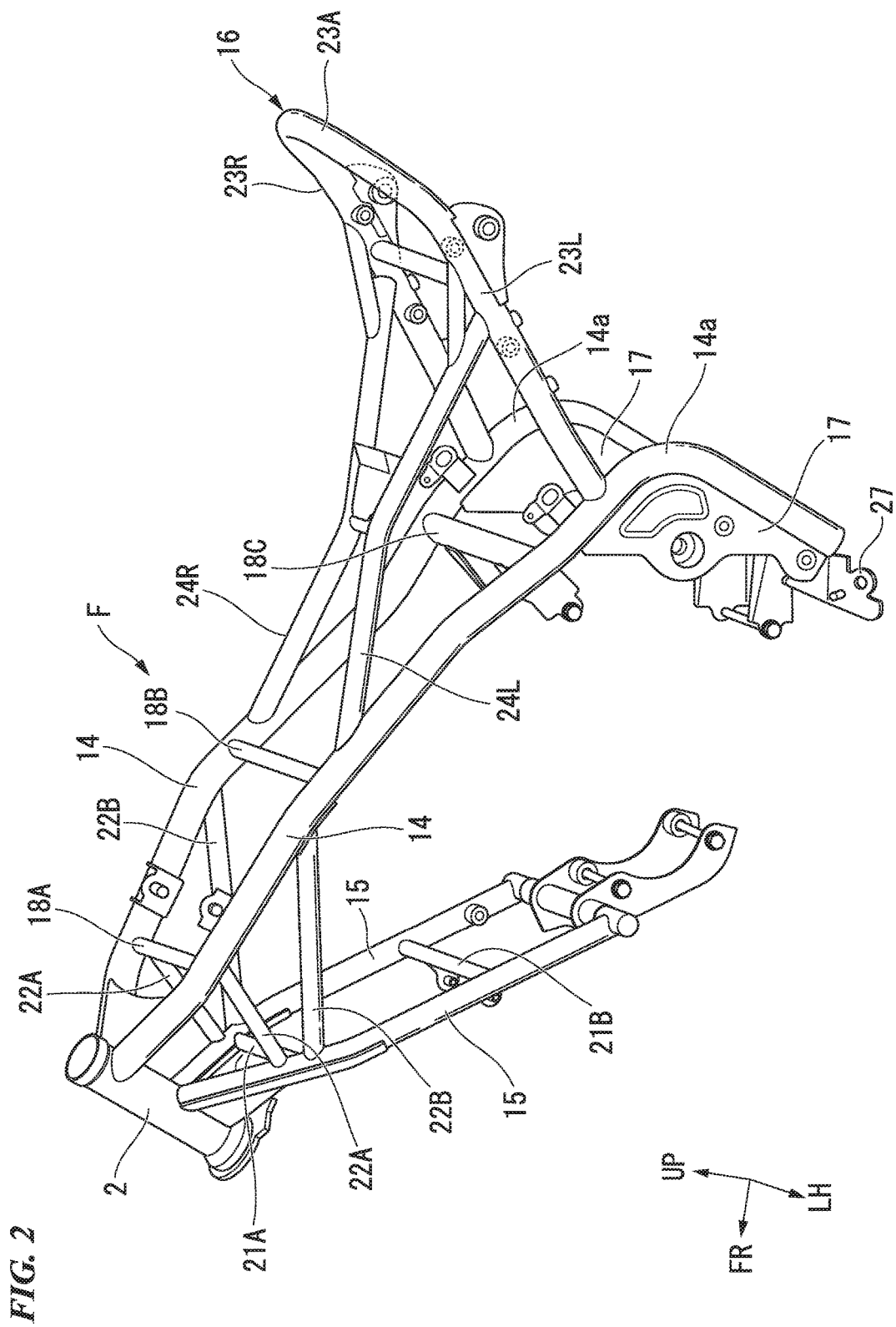
FIG. 2 is a perspective view showing a vehicle body frame of the saddle riding vehicle according to the embodiment of the present invention.

FIG. 2 is a view showing a major part of the vehicle body frame F of the motorcycle 1.

As also shown in FIG. 2, the vehicle body frame F includes the head pipe 2 disposed at a front end portion of the vehicle body frame F and configured to support a steering stem (not shown), a pair of left and right main frames 14 branched off from an upper rear side of the head pipe 2 toward left and right sides, extending rearward and downward when seen in a side view and then extending downward by changing a direction at rear curved sections 14a, a pair of left and right down frames 15 branched off from a lower rear side of the head pipe 2 toward left and right sides and extending rearward and downward to be steeply inclined more than the main frames 14 when seen in a side view, a rear frame 16 connected to rear upper surface sides of the left and right main frames 14, and a rear fender frame 60 (see FIG. 1) having a front region connected to the rear frame 16 and configured to support a rear fender 50 that covers an upper part of the rear wheel Wr. Further, in FIG. 2, the rear fender frame 60 is not shown.

The left and right main frames 14, in a plan view, are curved toward the outside in the vehicle width direction from joining sections at front end portions joining with the head pipe 2 such that once a separation width therebetween becomes a constant width, the separation width therebetween is narrowed toward the vicinity of the rear curved sections 14a, and then, the separation width is widened again downward from the vicinity of the rear curved sections 14a. The left and right main frames 14 are connected by a plurality of cross pipes 18A, 18B and 18C. A front region of a fuel tank 19 is disposed over a region, in which the separation width is large, of front section sides of the left and right main frames 14, and a rear region of the fuel tank 19 and an occupant-sitting seat 20 are disposed over a region, in which the separation width is small, of rear section sides of the left and right main frames 14 via the rear frame 16.

In addition, pivot blocks 17 are attached to the rear curved sections 14a of the left and right main frames 14 and lower regions thereof. The pivot sections 13a configured to support the front end portions of the swing arm 8 are attached to the pivot blocks 17.

The left and right down frames 15 are connected to each other by a plurality of cross pipes 21A and 21B, and upper side regions are connected to front regions of the left and right main frames 14 by gusset frames 22A and 22B.

A power unit PU in which the engine 30 and a gear box 31 are integrated is disposed in a region surrounded by the down frames 15 and the main frames 14. The power unit PU is attached to the down frames 15 and the main frames 14 to constitute a portion of the vehicle body frame F.

The rear frame 16 has a pair of left and right seat frame sections 23L and 23R extending from upper surfaces close to the rear curved sections 14a of the left and right main frames 14 toward rear upper sides (extending toward a rear position of the seat 20), and a connecting section 23A curved in substantially a U shape and configured to connect rear sections of the left and right seat frame sections 23L and 23R.

In addition, the rear frame 16 has a pair of left and right seat sub-frame sections 24L and 24R further extending from substantially intermediate positions in an extension direction of the left and right seat frame sections 23L and 23R toward front upper sides and having front end portions connected to the left and right main frames 14.

Figure 3:
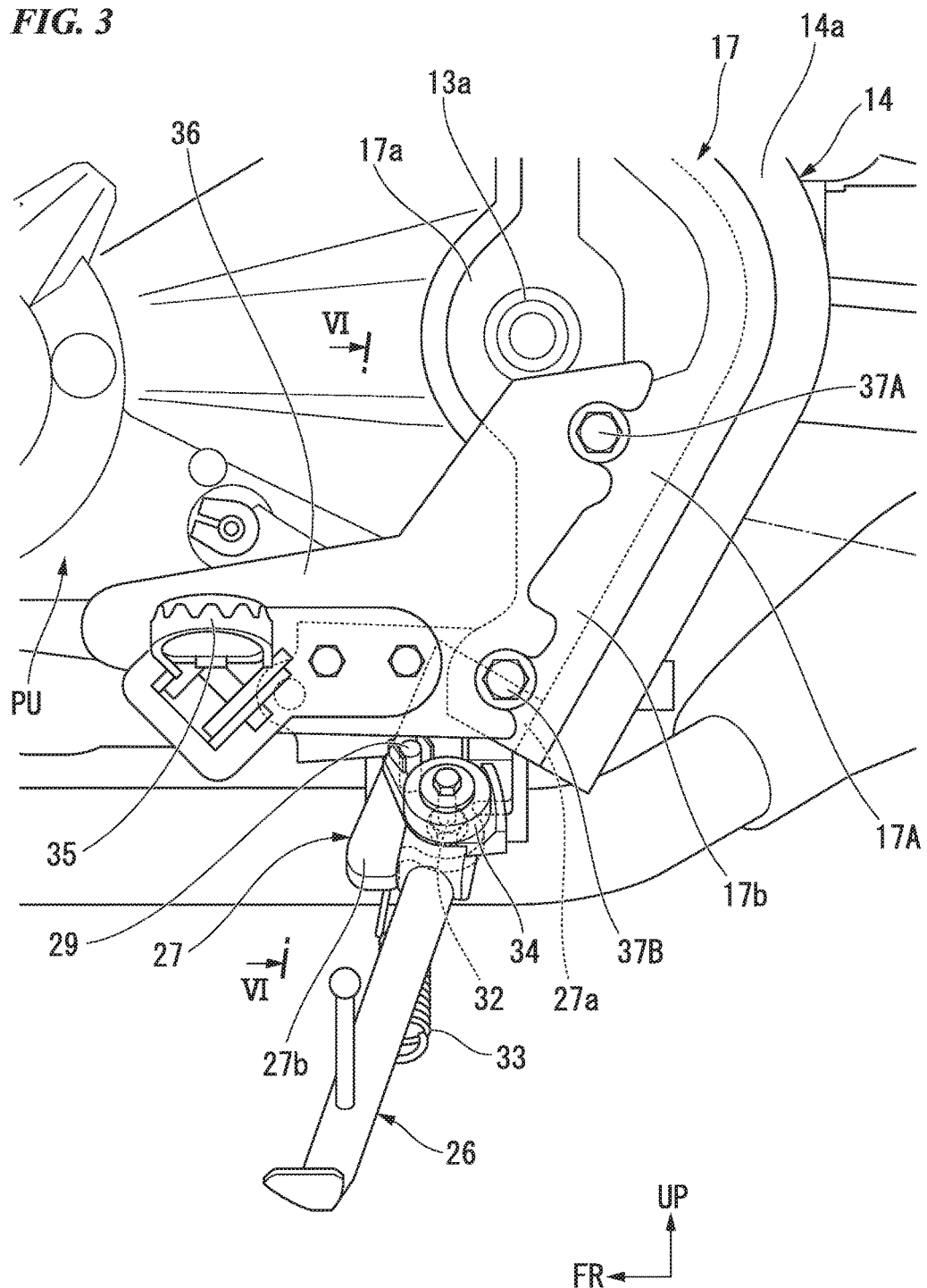
FIG. 3 is a side view showing the saddle riding vehicle according to the embodiment of the present invention, in which a portion of FIG. 1 is enlarged.
Figure 4:
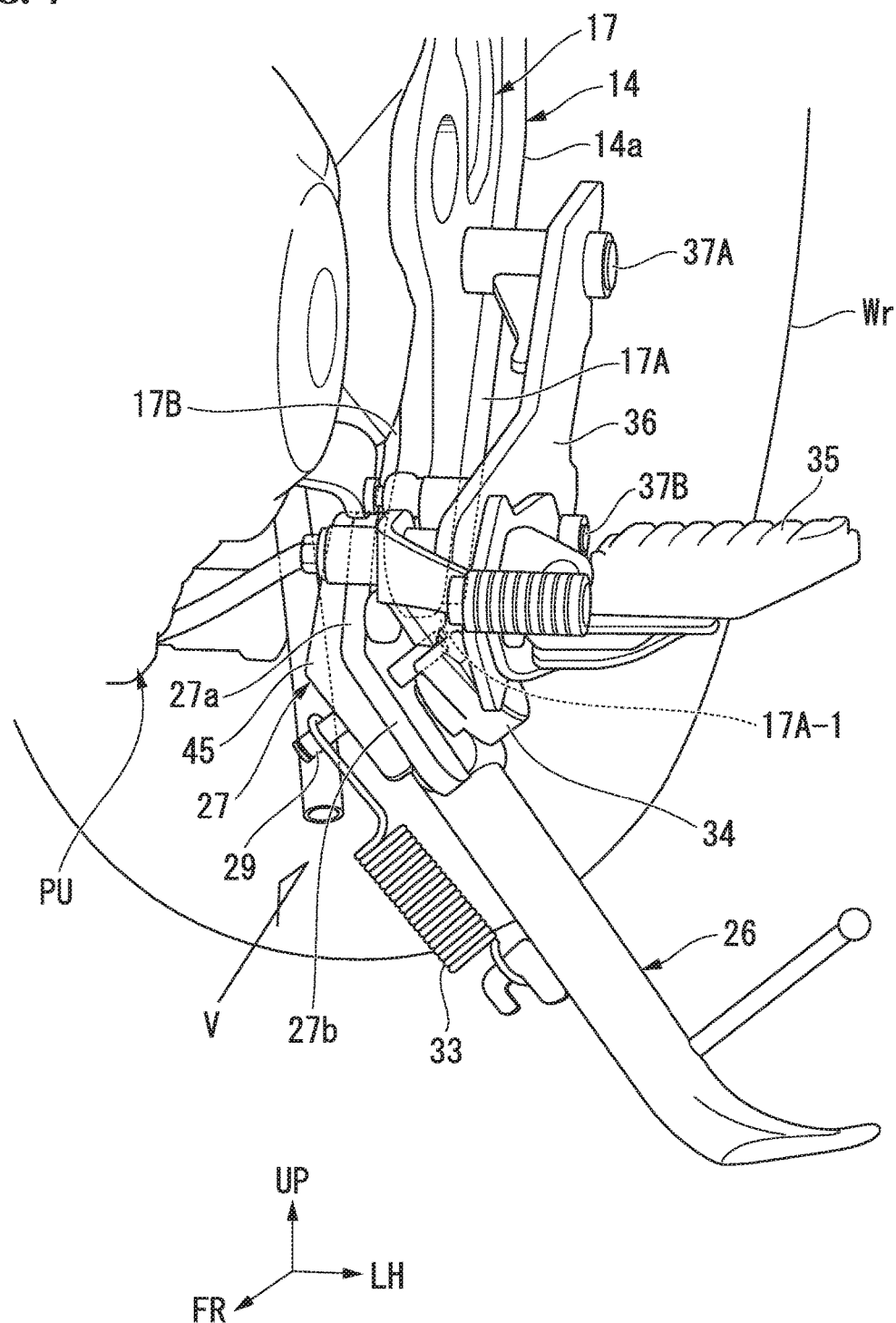
FIG. 4 is a perspective view of a stand support section of the saddle riding vehicle according to the embodiment of the present invention.
Figure 5:
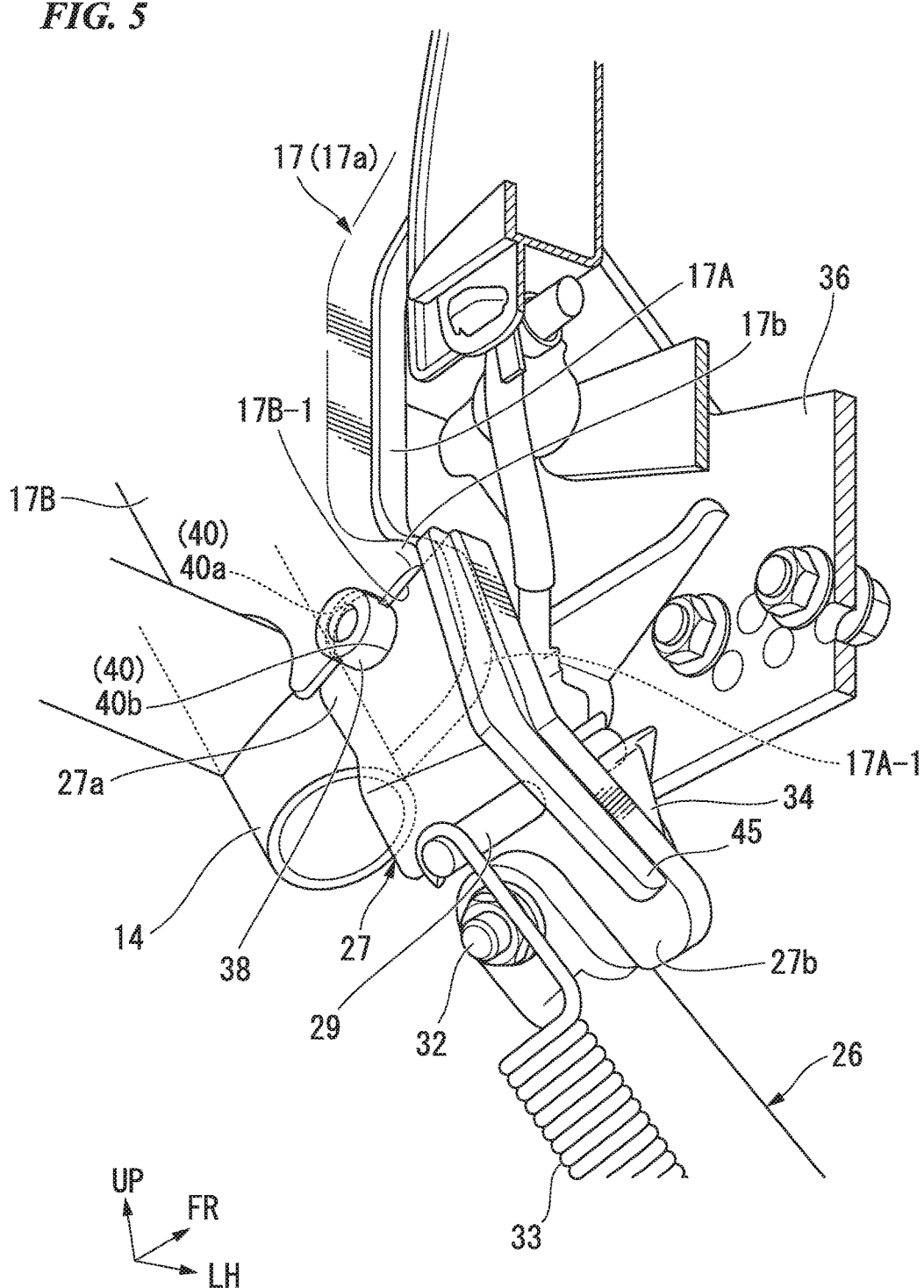
FIG. 5 is a view of the stand support section of the saddle riding vehicle according to the embodiment of the present invention, when seen from an arrow V shown in FIG. 4.
Figure 6:
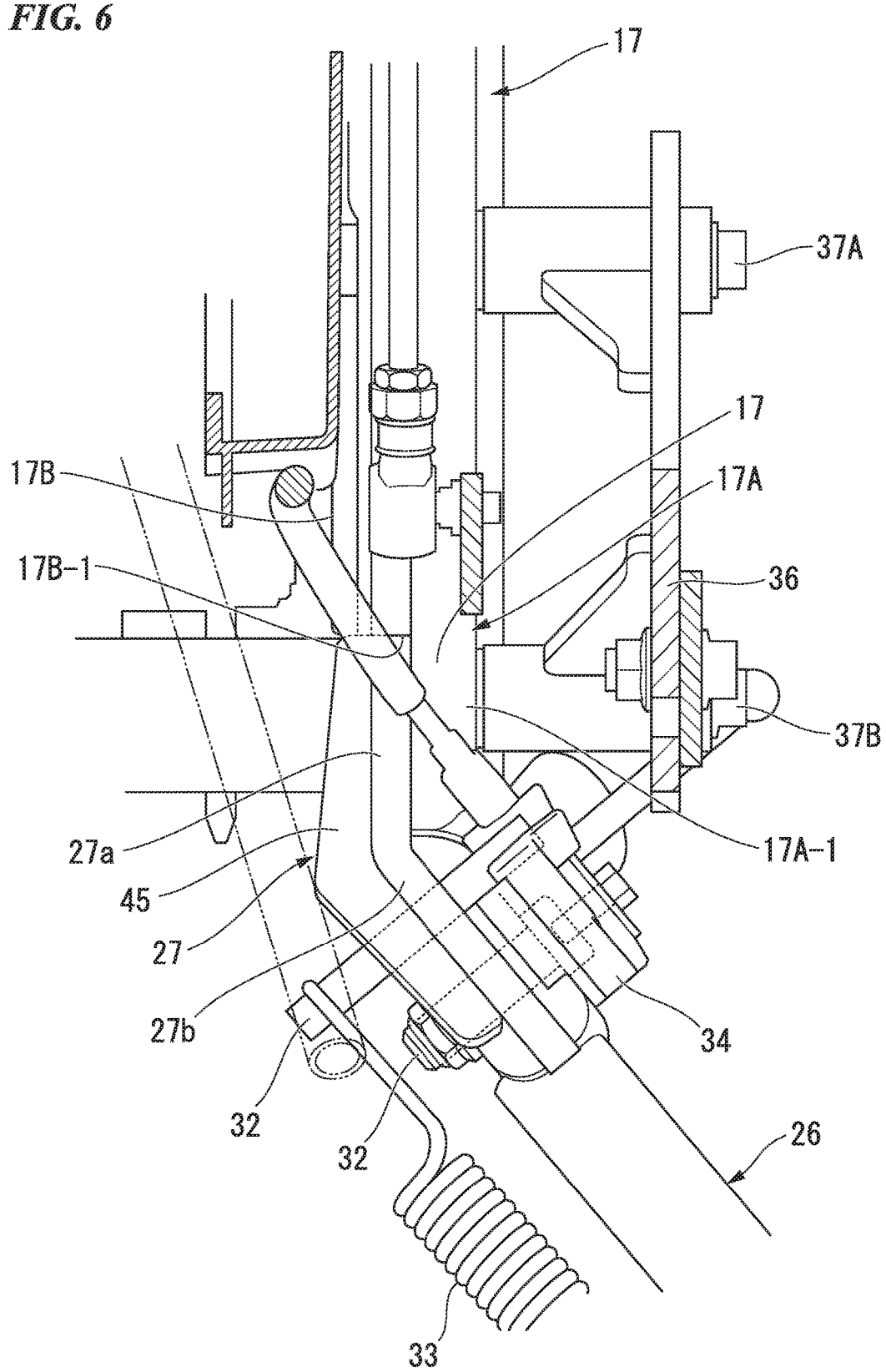
FIG. 6 is a front view of the saddle riding vehicle according to the embodiment of the present invention taken along line VI-VI in FIG. 3.
Figure 7:
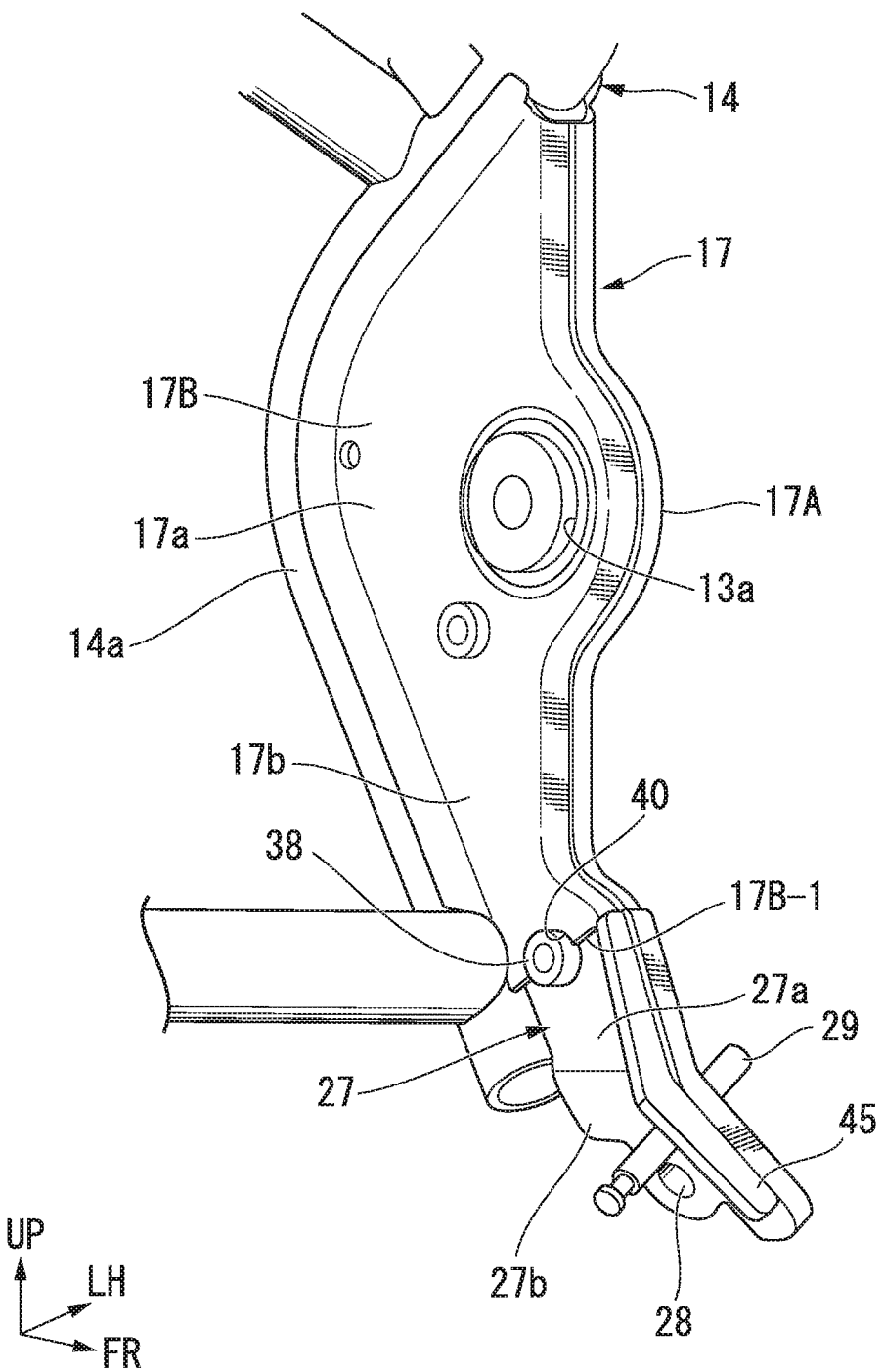
FIG. 7 is a perspective view of a pivot block portion of a left side of the saddle riding vehicle according to the embodiment of the present invention.
Figure 8:
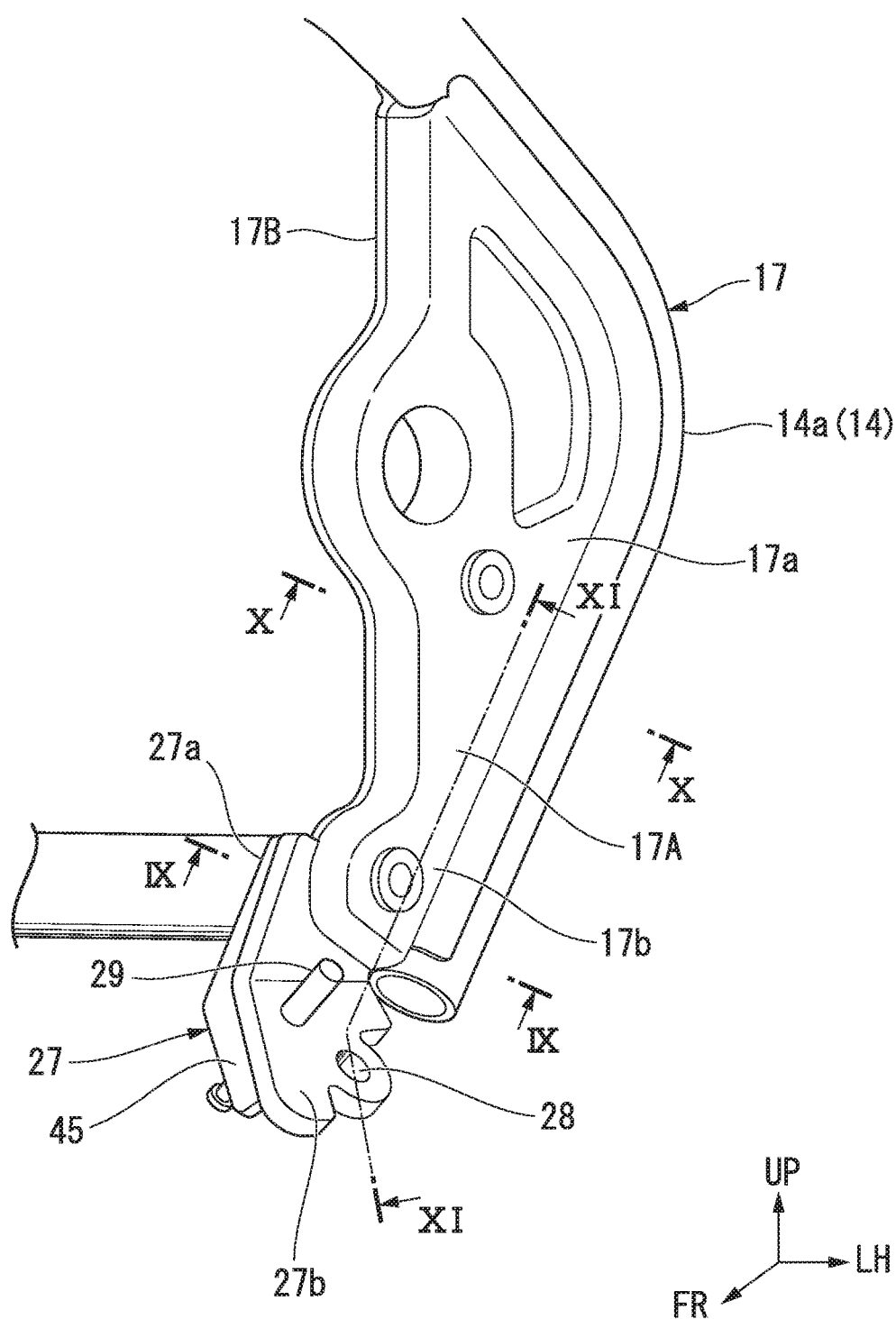
FIG. 8 is a perspective view of the pivot block portion of the left side of the saddle riding vehicle according to the embodiment of the present invention.
Figure 9:
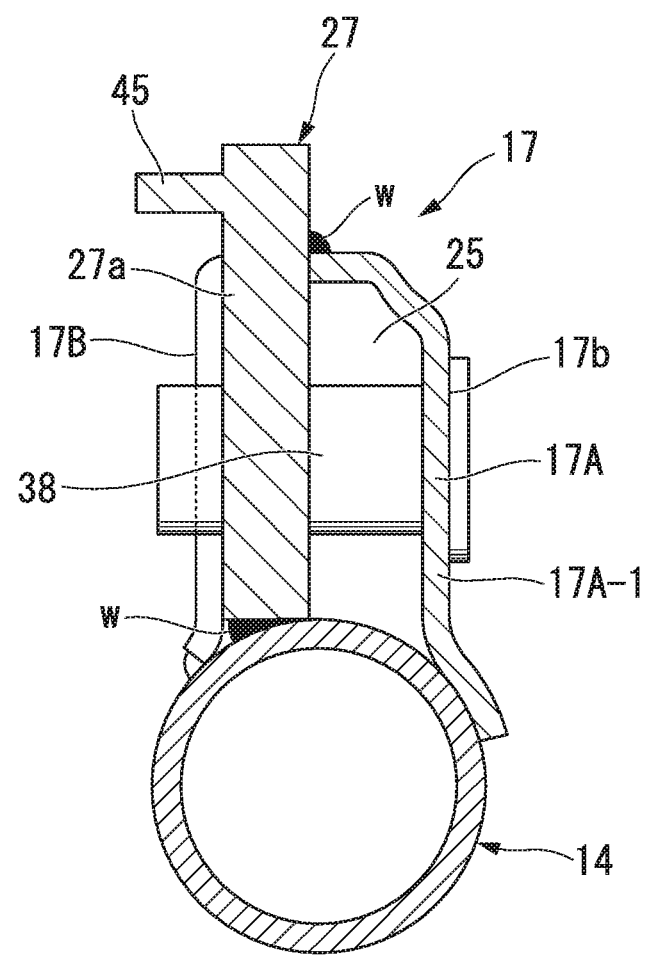
FIG. 9 is a cross-sectional view of the saddle riding vehicle according to the embodiment of the present invention taken along line IX-IX in FIG. 8.
Figure 10:
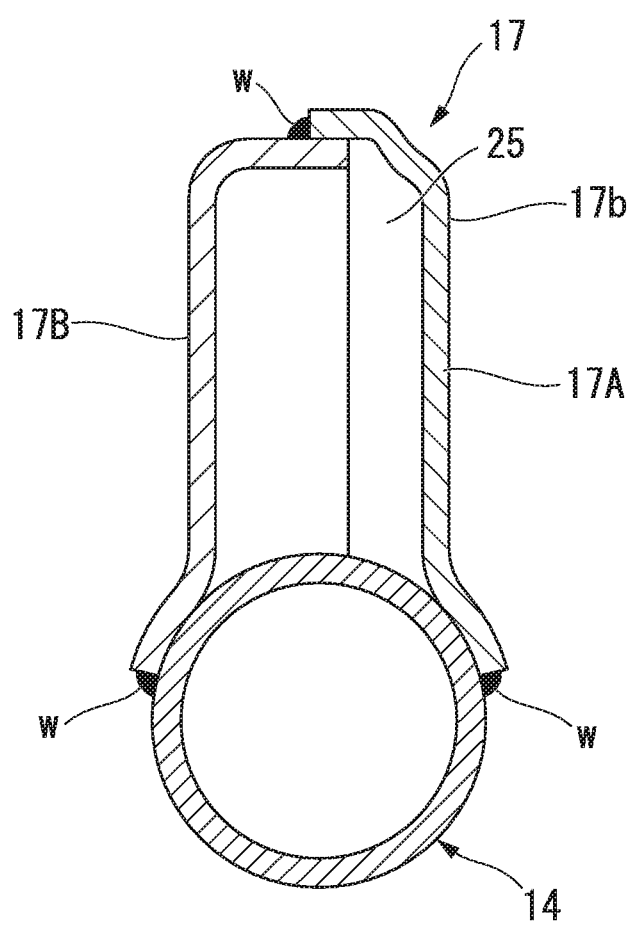
FIG. 10 is a cross-sectional view of the saddle riding vehicle according to the embodiment of the present invention taken along line X-X in FIG. 8.
Figure 11:
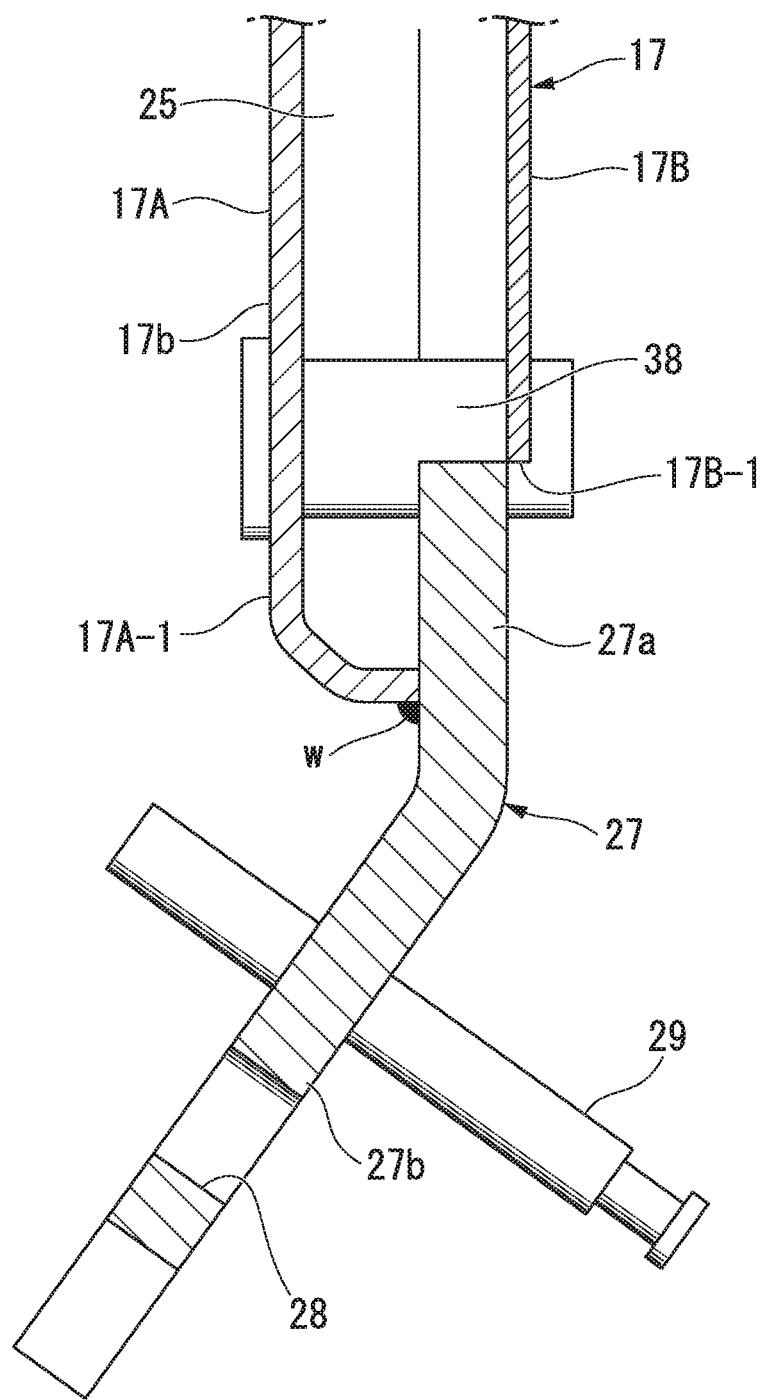
FIG. 11 is a cross-sectional view of the saddle riding vehicle according to the embodiment of the present invention taken along line XI-XI in FIG. 8.

FIG. 3 is a view showing an enlarged vicinity of lower end regions of the main frames 14, and FIG. 4 is a view when the same portion as in FIG. 3 is seen from an upper side of a left front section of the vehicle. In addition, FIG. 5 is a view when the same portion as in FIG. 3 is seen from a direction of an arrow V in FIG. 4, and FIG. 6 is a view when the same portion as in FIG. 3 is seen from a front side taken along line VI-VI in FIG. 3. In addition, FIG. 7 is a view when the pivot block 17 of a left side is seen from an upper front side at inside in the vehicle width direction (a vehicle body stand 26 or the like is not shown). In addition, FIG. 8 is a view when the pivot block 17 of the left side is seen from an upper front side at outside in the vehicle width direction (the vehicle body stand 26 or the like is not shown). In addition, FIG. 9 is a view showing a cross section taken along line IX-IX in FIG. 8, FIG. 10 is a view showing a cross section taken along line X-X in FIG. 8, and FIG. 11 is a view showing a cross section taken along line XI-XI in FIG. 8.

The pivot blocks 17 are fixed to regions of the rear curved sections 14a of the corresponding left and right main frames 14 throughout the lower end portions through welding, and protrude toward front sides of the regions. In each of the pivot blocks 17, a lower edge section 17b having a small forward/rearward width extends substantially along a lower edge shape of the main frame 14 at below of a block main body section 17a having a large forward/rearward width for supporting the pivot section 13a.

The pivot block 17 is constituted by coupling a first plate 17A on the outer side in the vehicle width direction and a second plate 17B on the inner side in the vehicle width direction to each other. Specifically, as shown in FIG. 8, rear edge sections of the first plate 17A and the second plate 17B are welded to outer surfaces of the main frames 14, substantially entire regions of the circumferential edge sections except for the rear edge sections are curved in opposite orientations, and both of the first plate 17A and the second plate 17B are fixed in a fitted state through welding. Accordingly, a hollow section 25 (see FIG. 10 and FIG. 11) is configured between the first plate 17A and the second plate 17B.

Here, while the pivot block 17 disposed at the right side of the vehicle body is formed such that the first plate 17A and the second plate 17B have substantially the same shape when seen in a side view, the pivot block 17 disposed at the left side of the vehicle body is formed such that the first plate 17A and the second plate 17B have different shapes when seen in a side view.

Specifically, while both of the block main body sections 17a are formed in substantially the same shape when seen in a side view, the lower edge section 17b has a downward extension length larger in the first plate 17A than in the second plate 17B. In addition, a lower end of the lower edge section 17b of the second plate 17B is linearly cut without forming a curved section curved toward the first plate 17A.

The cut portion is referred to as an extension end 17B-1 of the second plate 17B.

Accordingly, a portion of the lower edge section 17b of the first plate 17A protrudes by a predetermined length downward in the longitudinal direction farther than the extension end 17B-1 of the second plate 17B. A portion of the lower edge section 17b of the first plate 17A protruding downward farther than the extension end 17B-1 of the second plate 17B is referred to as a protrusion 17A-1.

A stand-supporting bracket 27 configured to pivotally support and flip up the vehicle body stand 26 (the side stand) is coupled to the protrusion 17A-1 of the first plate 17A in the pivot block 17 of the left side.

The stand-supporting bracket 27 has a base wall 27a overlapping an inner surface of the protrusion 17A-1 of the first plate 17A in the vehicle width direction and fixed to the protrusion 17A-1 through welding, and a support wall 27b continuously installed at an end portion of the base wall 27a at an obtuse angle. The support wall 27b is formed to be inclined outward in the vehicle width direction at a predetermined angle in a state in which the base wall 27a is fixed to the protrusion 17A-1 of the first plate 17A. As shown in FIG. 7 and FIG. 9, the base wall 27a is fixed to an end surface of the first plate 17A (a surface facing inward in the vehicle width direction) and an outer circumferential surface of the main frame 14. Further, in the drawings, a reference character w is attached to a welded section.

A flange section 45 protruding inward in the vehicle width direction protrudes from the base wall 27a of the stand-supporting bracket 27 and a front edge portion of the support wall 27b. As shown in FIG. 5, a thickness in the vehicle width direction of a region (a coupling section) of the base wall 27a of the stand-supporting bracket 27 except for the flange section 45 is set to be equal to or smaller than a thickness in the vehicle width direction of the second plate 17B.

A locking rod 29 is attached to the support wall 27b of the stand-supporting bracket 27 while a stand attachment hole 28 (see FIG. 8) is formed. A support rod 32 configured to pivotally support an upper end portion of the vehicle body stand 26 is inserted through the stand attachment hole 28. The locking rod 29 protrudes from both inner and outer sides in the vehicle width direction of the support wall 27b.

One end portion of a bias spring 33 configured to bias the vehicle body stand 26 in a flip-up direction is locked to a portion of the locking rod 29 protruding inward in the vehicle width direction. In addition, the portion of the locking rod 29 protruding outward in the vehicle width direction locks a portion of a flip-up detection switch 34 of the vehicle body stand 26.

In addition, a step support bracket 36 configured to support a main step 35 is fastened and fixed to the outside of the left and right pivot blocks 17 in the vehicle width direction by bolts 37A and 37B. The bolts 37A and 37B are screwed in tubular screw receiving members 38 (see FIG. 5, FIG. 9 and FIG. 11) attached to the pivot block 17 so as to pass through in the vehicle width direction. In FIG. 5, FIG. 9 and FIG. 11, the lower side screw receiving member 38 attached to the left side pivot block 17 is shown.

Here, in the left side pivot block 17, as shown in FIG. 5, a semi-circular notch 40a is formed in the extension end 17B-1 of the second plate 17B. On the other hand, a semi-circular notch 40b opposite to the notch 40a of the second plate 17B and having the same radius as the notch 40a of the second plate 17B is formed at an upper end portion of the support wall 27b of the stand-supporting bracket 27. The notch 40a of the second plate 17B and the notch 40b of the stand-supporting bracket 27 constitute a supporting hole 40 configured to support the lower side of the screw receiving member 38.

Accordingly, the lower side screw receiving member 38 (the other components) is supported by the supporting hole 40 formed to extend over the extension end 17B-1 of the second plate 17B and the stand-supporting bracket 27.

As described above, in the stand support structure of the motorcycle 1 according to the embodiment, since the stand-supporting bracket 27 is joined to the protrusion 17A-1 of the pivot block 17 that does not overlap the second plate 17B on the first plate 17A, an occupied space of the installation section of the base wall 27a of the stand-supporting bracket 27 in the vehicle width direction is reduced. In addition, in the stand support structure according to the embodiment, since a portion of the lower edge section 17b of the second plate 17B is cut out and the stand-supporting bracket 27 is disposed thereat, a reduction in a weight of the vehicle can be achieved by as much as the weight of the cut out amount of the lower edge section 17b of the second plate 17B.

Accordingly, when the stand support structure according to the embodiment is employed, suppression of the occupied space of the installation section of the stand-supporting bracket 27 in the vehicle width direction and a reduction in weight of the vehicle can be achieved.

In addition, in the stand support structure according to the embodiment, the second plate 17B of the pivot block 17 of the left side is disposed on an inner side of the first plate 17A in the vehicle width direction, and the stand-supporting bracket 27 is coupled to a surface on an inner side of the protrusion 17A-1 of the first plate 17A in the vehicle width direction. For this reason, a boundary section between the second plate 17B and the stand-supporting bracket 27 is covered by the first plate 17A from the outside in the vehicle width direction, and the boundary section cannot be easily seen from the outside.

Accordingly, when the stand support structure according to the embodiment is employed, the appearance of the vehicle can be improved.

In addition, in the stand support structure according to the embodiment, a thickness in the vehicle width direction of the base wall 27a of the stand-supporting bracket 27 joined to the protrusion 17A-1 is equal to or smaller than a thickness of the second plate 17B in the vehicle width direction. For this reason, the occupied space inside of the stand-supporting bracket 27 in the vehicle width direction can be reduced, and a further reduction in size of the motorcycle 1 can be achieved.

Further, in the stand support structure according to the embodiment, the stand-supporting bracket 27 is fixed to not only the first plate 17A of the pivot block 17 but also the main frames 14 through welding.

Accordingly, when the stand support structure according to the embodiment is employed, a joining section area of the stand-supporting bracket 27 is increased, and joining strength of the stand-supporting bracket 27 is enhanced.

In addition, in the case of the stand support structure according to the embodiment, the supporting hole 40 configured to support the screw receiving member 38 is formed between the extension end 17B-1 of the second plate 17B of the pivot block 17 and the end portion of the stand-supporting bracket 27 so as to extend over both of them. For this reason, the supporting hole 40 configured to support the screw receiving member 38 can be formed simultaneously with machining of the extension end 17B-1 of the second plate 17B and the end portion of the stand-supporting bracket 27.

Accordingly, when the stand support structure according to the embodiment is employed, the supporting hole 40 can be easily formed and manufacturing costs can be suppressed.

In addition, in the stand support structure according to the embodiment, since the first plate 17A and the second plate 17B of the pivot block 17 are coupled to each other and the hollow section 25 is formed therebetween, a reduction in weight of the pivot block 17 and a further reduction in weight of the motorcycle 1 as a whole can be achieved.

Further, the present invention is not limited to the embodiment but various design changes may be made without departing from the scope of the present invention. For example, in the embodiment, while the stand-supporting bracket 27 is attached to the pivot block 17 of the left side of the vehicle, the stand-supporting bracket 27 may be attached to the pivot block 17 of the right side of the vehicle.

In addition, all vehicles on which a driver rides on the vehicle body are included as the saddle riding vehicle, and in addition to the motorcycle (including a motorized bicycle and a scooter type vehicle), a three-wheeled vehicle as a two-front-wheeled and one-rear-wheeled vehicle or the like may also be included.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A stand support structure of a saddle riding vehicle comprising:
   a main frame of the vehicle;
   a pivot block that is formed by coupling a first plate and a second plate to each other, which are attached to the main frame, and that is configured to swingably support a rear wheel-supporting swing arm; and
   a stand-supporting bracket attached to the pivot block and configured to support a vehicle body stand,
   wherein the first plate of the pivot block has a protrusion protruding in a longitudinal direction farther than an extension end of the second plate,
   wherein the stand-supporting bracket is coupled to a surface of the protrusion facing in a vehicle width direction,
   wherein the second plate is disposed on an inner side of the first plate in the vehicle width direction,
   wherein the stand-supporting bracket is coupled to an inner surface of the protrusion in the vehicle width direction, and
   wherein a thickness of a coupling section of the stand-supporting bracket in the vehicle width direction with respect to the protrusion is equal to or smaller than a thickness of the second plate in the vehicle width direction.

2. The stand support structure of the saddle riding vehicle according to claim 1, wherein the stand-supporting bracket is joined to the first plate and the main frame.

3. The stand support structure of the saddle riding vehicle according to claim 1, wherein a hollow section is formed between the first plate and the second plate, which are coupled to each other.

4. The stand support structure of the saddle riding vehicle according to claim 2, wherein the stand-supporting bracket is joined to the main frame in between the first plate and the second plate.

5. The stand support structure of the saddle riding vehicle according to claim 1, wherein the stand-supporting bracket is coupled to the surface of the protrusion facing in the vehicle width direction on an extension line of the second plate in the longitudinal direction.

6. The stand support structure of the saddle riding vehicle according to claim 1, wherein a supporting hole configured to support another component is formed between the extension end of the second plate and the stand-supporting bracket so as to extend over the extension end and the stand-supporting bracket.

7. A stand support structure of a saddle riding vehicle comprising:
   a main frame of the vehicle;
   a pivot block that is formed by coupling a first plate and a second plate to each other, which are attached to the main frame, and that is configured to swingably support a rear wheel-supporting swing arm; and
   a stand-supporting bracket attached to the pivot block and configured to support a vehicle body stand,
   wherein the first plate of the pivot block has a protrusion protruding in a longitudinal direction farther than an extension end of the second plate,
   wherein the stand-supporting bracket is coupled to a surface of the protrusion facing in a vehicle width direction,
   wherein the second plate is disposed on an inner side of the first plate in the vehicle width direction,
   wherein the stand-supporting bracket is coupled to an inner surface of the protrusion in the vehicle width direction, and
   wherein a supporting hole configured to support another component is formed between the extension end of the second plate and the stand-supporting bracket so as to extend over the extension end and the stand-supporting bracket.

* * * * *